(12) United States Patent
Feaver et al.

(10) Patent No.: US 7,816,413 B2
(45) Date of Patent: Oct. 19, 2010

(54) CARBON-BASED FOAM NANOCOMPOSITE HYDROGEN STORAGE MATERIAL

(75) Inventors: Aaron Feaver, Seattle, WA (US); Guozhong Cao, Seattle, WA (US)

(73) Assignees: EnerG2, Inc., Seattle, WA (US); University of Washington, Seattle, WA (US)

( * ) Notice: Subject to any disclaimer, the term of this patent is extended or adjusted under 35 U.S.C. 154(b) by 704 days.

(21) Appl. No.: 11/565,463

(22) Filed: Nov. 30, 2006

(65) Prior Publication Data
US 2007/0292732 A1 Dec. 20, 2007

Related U.S. Application Data

(60) Provisional application No. 60/740,960, filed on Nov. 30, 2005.

(51) Int. Cl.
*C08J 3/02* (2006.01)
*C01B 6/04* (2006.01)
*H01M 8/22* (2006.01)

(52) U.S. Cl. .............. 516/100; 423/646; 423/647; 429/505

(58) Field of Classification Search ............ 429/12; 516/100, 104, 99
See application file for complete search history.

(56) References Cited

U.S. PATENT DOCUMENTS

| | | | |
|---|---|---|---|
| 4,580,404 A | 4/1986 | Pez et al. | |
| 5,945,084 A * | 8/1999 | Droege | 423/447.4 |
| 6,309,446 B1 | 10/2001 | Nakanoya et al. | |
| 6,528,441 B1 * | 3/2003 | Heung et al. | 501/12 |
| 7,052,671 B2 | 5/2006 | McClaine | |
| 7,118,611 B2 | 10/2006 | Snow | |
| 7,282,466 B2 * | 10/2007 | Long et al. | 502/185 |
| 7,316,788 B2 * | 1/2008 | Autrey et al. | 252/182.34 |
| 2003/0190501 A1 | 10/2003 | Rendina | |
| 2005/0025921 A1 | 2/2005 | Finamore | |
| 2006/0051638 A1 | 3/2006 | Gross | |

FOREIGN PATENT DOCUMENTS

WO   WO 2005/014469   * 2/2005

OTHER PUBLICATIONS

Nathalie Job, Rene Pirard, Jose Marien, Jean-Paul Pirard; "Synthesis of transition metal-doped carbon xerogels by solubilization of metal salts in resorcinol-formaldehyde aqueous solution" Carbon 42(2004) 3217-3237.

(Continued)

*Primary Examiner*—Patrick Ryan
*Assistant Examiner*—Thomas H. Parsons
(74) *Attorney, Agent, or Firm*—Seed IP Law Group PLLC

(57) ABSTRACT

A carbon-based foam composite including a carbon-based foam and a solid state hydrogen storage material, methods for making the carbon-based foam composite, and methods for using the carbon-based foam composite. Representative carbon-based foams include cryogels, aerogels, and xerogels. Representative solid state hydrogen storage materials include metal hydrides and chemical hydrides.

18 Claims, 11 Drawing Sheets

OTHER PUBLICATIONS

Nathalie Job, Manuel Fernando Ribeiro Pereira, Stéphanie Lambert, Amandine Cabiac, Gérard Delahay, Jean-François Colomer, Jose Marien, José Luis Figueiredo, Jean-Paul Pirard; "Highly dispersed platinum catalysts prepared by impregnation of texture-tailored carbon xerogels" Journal of Catalysis 240 (2006) 160-171.

B.M. Babić, Lj.M. Vraćar, B. Radmilović, N.W. Krstajić; "Carbon cryogel as support of platinum nano-sized electrocatalyst for the hydrogen oxidation reaction" Electrochimica Acta 51 (2006) 3820-3826.

Examination Report re European Application No. 06844746.5; dated Jul. 28, 2009.

* cited by examiner

CARBON-BASED FOAM NANOCOMPOSITE HYDROGEN STORAGE MATERIAL

CROSS-REFERENCE TO RELATED APPLICATION

This application claims the benefit of U.S. Provisional Application No. 60/740,960, filed Nov. 30, 2005, expressly incorporated herein by reference in its entirety.

BACKGROUND OF THE INVENTION

It is well recognized that hydrogen fuel generated from renewable power would be a desirable option to continued use of fossil fuels. Hydrogen powered fuel cells are developing rapidly, are more efficient than internal combustion engines, and have only water as an emission. Unfortunately, hydrogen storage systems suitable for automotive and other small-scale industrial or residential applications remain elusive. Solid state hydrogen materials such as metal hydrides or chemical hydride are some of the best potential materials for solving this problem. Unfortunately these materials have their own problems including poor reversibility, unacceptable reaction kinetics, and inadequate thermal conductivity. A cursory review of known hydrides reveals that materials with a high hydrogen content react at thermodynamically difficult temperatures and/or pressures whereas those with reasonable re/dehydrogenation contain little hydrogen. Hydride-based storage materials have been mixed with materials such as expanded graphite, porous aluminum foams, and porous silicon. While the exact mechanism that causes these materials to be of benefit is not always clear, the results have clearly demonstrated improvements to the reaction kinetics or thermodynamics of the hydriding or dehydriding reaction.

Despite the advances in hydrogen storage materials noted above, a need exists for improved hydrogen storage materials and methods for making these materials. The present invention seeks to fulfill these needs and provides further related advantages.

SUMMARY OF THE INVENTION

The present invention provides compositions and methods for storing hydrogen.

In one aspect, the present invention provides a composite comprising a carbon-based foam and a solid state hydrogen storage material. In one embodiment, the carbon-based foam is a carbon cryogel. In another embodiment, the carbon-based foam is a carbon aerogel. In another embodiment, the carbon-based foam is a carbon xerogel. The solid state hydrogen storage material is a hydrogen storage material. The solid state hydrogen storage material can be a metal hydride or a chemical hydride. In one embodiment, the metal hydride is magnesium hydride. In one embodiment, the chemical hydride is ammonia borane. In one embodiment, the composite further comprises a catalyst that is effective in lowering the temperature required for release of hydrogen from the composite, for increasing the amount of hydrogen released from the composite at a particular temperature, or for increasing or controlling the rate at which hydrogen is released from the composite. In one embodiment, the composite further comprises surfaces that have been modified to include sulfur groups. The carbon-based foam has a surface area of from about 20 $m^2$/g to about 3000 $m^2$/g.

In another aspect, a method for making a carbon cryogel is provided. In one embodiment, the method includes preparing a sol by mixing a catalyst and at least two components capable of forming an organic sol-gel in water; gelling the sol by heating at a temperature and for a time sufficient to provide a gel; drying the gel to provide a polymer foam; pyrolyzing the polymer foam to provide a carbon-based foam; and contacting the carbon-based foam with a solid state hydrogen storage material in a form that allows the solid state hydrogen storage material to infiltrate the carbon-based foam to provide a carbon-based foam composite. In one embodiment, the components capable of forming a sol-gel comprise resorcinol and formaldehyde. In one embodiment, the molar ratio of resorcinol to catalyst is from about 10 to about 2000. In one embodiment, gelling the sol comprises heating at a temperature and for a period of time sufficient to convert the sol to a crosslinked gel. In one embodiment, gelling the sol comprises heating at about 90° C. for from about 1 to about 7 days. In the method, drying the gel comprises freeze drying, supercritically drying, or evaporation drying the gel. In one embodiment, pyrolyzing the polymer foam comprises heating at a temperature and for a time sufficient to provide a carbon-based foam. In one embodiment, pyrolyzing the polymer foam comprises heating at about 1050° C. for about 4 hours in a substantially oxygen-free environment. In one embodiment, the carbon-based foam is further heated at a temperature and for a time sufficient to provide an activated carbon-based foam. In one embodiment, heating at a temperature and for a time sufficient to provide an activated carbon-based foam comprises heating at about 900° C. under carbon dioxide.

In one embodiment, the solid state hydrogen storage material for infiltrating the foam is in liquid form. In one embodiment, the solid state hydrogen storage material is a metal hydride, and in another embodiment, the solid state hydrogen storage material is a chemical hydride.

In another aspect of the invention, a method for hydrogen storage is provided. In one embodiment, the method comprises contacting a vessel containing a hydrogen storage material with hydrogen, wherein the hydrogen storage material comprises a carbon-based foam composite of the invention.

In another aspect, the invention provides a gas storage vessel. The gas storage vessel comprises a vessel and a carbon-based foam composite of the invention.

In another aspect of the invention, a method for charging a carbon-based foam composite with a solid state hydrogen storage material is provided. In one embodiment, the method comprises contacting a carbon-based foam composite that has discharged an amount of hydrogen with a solid state hydrogen storage material. In one embodiment, the solid state hydrogen storage material is in a liquid.

In another aspect, the invention provides a method for charging a carbon-based foam composite with hydrogen. In one embodiment, the method comprises contacting a hydrogen storage vessel containing a carbon-based foam composite with a source of hydrogen. In this embodiment, the carbon-based foam composite is a composite that has been at least partially depleted of hydrogen, and the source of hydrogen has a pressure sufficient to cause the hydrogen to infiltrate the carbon-based foam composite to provide a hydrogen-enriched carbon-based foam composite.

In another aspect, a device for charging a hydrogen-depleted composite with hydrogen is provided.

In another aspect of the invention, a method for discharging hydrogen stored in a composite is provided.

In another aspect, the present invention provides a system comprising a hydrogen storage vessel containing a composite of the invention and a fuel cell capable of converting hydrogen into energy. In the system, the vessel is in gaseous communication with the fuel cell for providing hydrogen released from the composite to the fuel cell. In one embodiment, the fuel cell is in thermal communication with the composite such that heat from the fuel cell is directed to the composite for releasing hydrogen.

In another aspect, the invention provides a method for lowering the temperature required for releasing hydrogen from a solid state hydrogen storage material. In the method, a carbon-based foam is contacted with a solid state hydrogen storage material having a first hydrogen release temperature to provide a composite having a second hydrogen release temperature. The second hydrogen release temperature is lower than the first hydrogen release temperature. In one embodiment, the solid state hydrogen storage material comprises a metal hydride. In another embodiment, the solid state hydrogen storage material comprises a chemical hydride.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE INVENTION

Figure 1A:
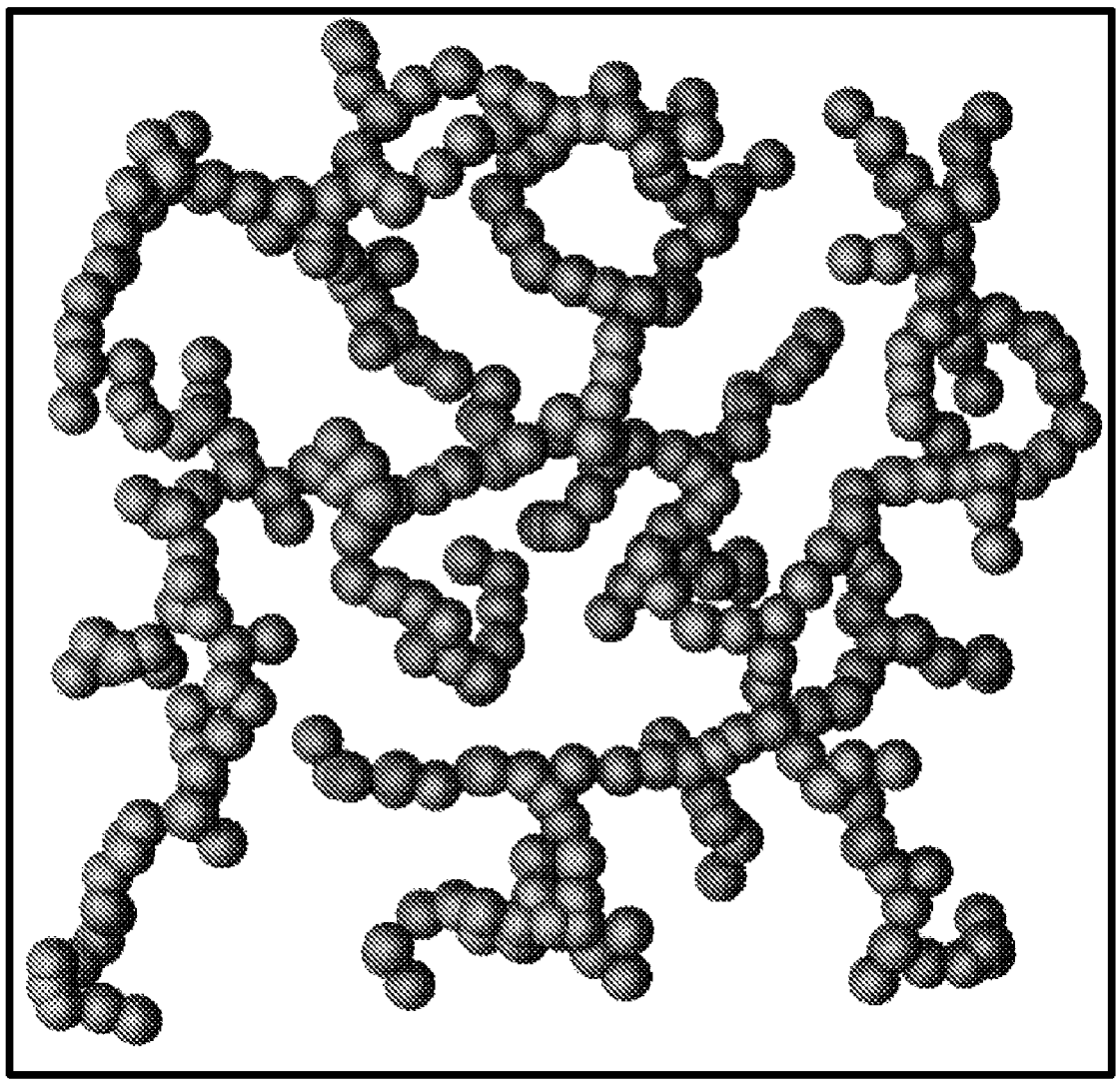
FIG. 1A is a schematic illustration of an unmodified carbon cryogel useful in making the carbon-based foam composite of the invention.

In one aspect, the present invention provides a composite comprising a carbon-based foam and a solid state hydrogen storage material. The carbon-based foam composite is capable of storing large quantities of hydrogen in small volumes and at low weights. As used herein, the term "carbon-based foam" refers to a class of materials, which can be derived from the sol-gel process, characterized as an interconnected porous, high surface area carbon material. Carbon-based foams are distinguished from other carbon materials such as, for example, expanded graphite, in that the foams are highly porous materials having a network of extended, interconnected pores.

In one embodiment, the carbon-based foam is formed by a sol-gel process. The sol-gel process involves forming a solid porous network by a polymerization reaction that provides a solid sol-gel from an initial liquid sol. The initial sol typically includes two organic compounds and a catalyst in a liquid. The two organic compounds react, aided by the catalyst, to form a polymer network that is the sol-gel. The sol-gel process first provides a colloidal suspension (the liquid sol) that is then polymerized to form the solid sol-gel.

The carbon-based foam is an interconnected micro-/mesoporous material that can be at least partially filled with a solid state hydrogen storage compound. As used herein, the term "solid state hydrogen storage material" refers to a class of materials characterized by an ability to store hydrogen in a solid form that can then release gaseous hydrogen. It will be appreciated that, although these hydrogen storage materials do not necessarily store hydrogen as molecular (diatomic) hydrogen, the hydrogen storage materials do release molecular (diatomic) hydrogen. As described below, the hydrogen storage materials can be hydrides (e.g., metal and chemical hydrides). As also further described below, certain depleted hydrogen storage materials (i.e., hydrogen depleted metal hydride storage materials) can be recharged by treatment with molecular hydrogen.

In one embodiment, the carbon-based foam is a carbon cryogel. As used herein, the term "cryogel" refers to a class of carbon-based foams formed by a process that includes freeze-drying a sol-gel. Representative cryogels have a total pore volume of from about 1.0 to about 1.5 $cm^3/g$; a total pore volume (single point nitrogen adsorption) of from about 1.2 to about 1.4 $cm^3/g$; and a variety of maximum pore size distributions, a maximum pore size distribution of less than about 5 nm; a maximum pore size distribution of from about 0.5 nm to about 2.0 nm, from about 5 nm to about 10 nm, from about 10 nm to about 20 nm, from about 20 nm to about 50 nm, or greater than about 50 nm.

In one embodiment, the carbon-based foam is a carbon aerogel. As used herein, the term "aerogel" refers to carbon-based foams formed by a process that includes drying a sol-gel with supercritical carbon dioxide.

In one embodiment, the carbon-based foam is a carbon xerogel. As used herein, the term "xerogel" refers to carbon-based foams formed by a process that includes drying a sol-gel by evaporation.

The carbon-based foams useful in making the carbon-based foam composites of the invention have a surface area of from about 20 $m^2/g$ to about 3000 $m^2/g$.

The solid state hydrogen storage material is loaded into the pores of a carbon-based foam to provide the composite of the invention. Loading into the pores of the foam can be accomplished by any method that will allow the solid state hydrogen storage material to properly infiltrate the foam. Because the foam is highly porous, a large amount of solid state hydrogen storage material can be loaded into the foam. The goal of loading the solid state hydrogen storage material into a high surface area foam, such as a carbon-based foam, is to provide a solid framework on which to support solid state hydrogen storage materials in a maximum surface area. Solid state hydrogen storage materials themselves generally have a powder form and thus cannot easily be manipulated in the solid state. By coating the surface of a foam with the solid state hydrogen storage material, a more structured and higher surface area composite is formed. The resulting composite has a high storage capacity due to the large surface area. Such composites are more easily incorporated into practical devices. For example, in a hydrogen gas storage device, the difference between having a vessel filled with a solid state hydrogen gas storage material in powdered form versus a solid state hydrogen storage material loaded into a carbon-based foam is not only that the foam has a higher surface area and thus provides for an increased amount of hydrogen to be stored and released, but also that a solid block of the foam material is more readily handled than the formless powder. The carbon-based foam makes a solid state hydrogen storage material more efficient and more portable.

The solid state hydrogen storage material can be any compound able to store hydrogen. Unless otherwise indicated, as used herein, the term "hydrogen" refers to molecular (diatomic) hydrogen (i.e., $H_2$). In one embodiment, the solid state hydrogen storage material is a metal hydride. For metal hydrides, hydride formation occurs at the metal center with the absorption of hydrogen at the surface by chemisorption. In one embodiment, the metal hydride is magnesium hydride ($MgH_2$), as described in Example 1. In another embodiment, the solid state hydrogen storage material is a chemical hydride. These materials are generally Lewis acid/base complexes and the most common are boron and aluminum containing compounds, commonly referred to as borates and alanates. The structure of these materials is generally a tetragonal anion $[AlH_4]^-$ or $[BH_4]^-$ bound to a cation, usually $Li^+$ or $Na^+$. These compounds release hydrogen at varying temperatures and contain as much as 20 weight percent hydrogen. In one embodiment, the chemical hydride is ammonia borane (AB), as described in Example 2. $MgH_2$ and AB are representative examples of hydrogen storage materials. There are an abundance of gas storage materials that may be inserted into a carbon-based foam. Suitable metal hydrides for insertion into a carbon-based foam for hydrogen absorption include $Mg_2FeH_6$; $Na_3AlH_6$; $NaAlH_4$; $MnNi_5H_6$; $TiCr_{1.8}H_{1.7}$; $Mg_2NiH_4$; $PdH_{0.6}$; $CaNi_5H_5$; $TiFeH$; $MgH_2$; $LaNi_{5.5}Al_{1.5}H_5$; and $LaNi_4AlH_5$. Suitable chemical hydrides for insertion into a carbon-based foam include $LiAlH_4$, $LiBH_4$, $NaAlH_4$, and $NaBH_4$.

Carbon-based foams for storing gas can be optimized to achieve the desired level of storage. For example, different storage materials can be used, different loading techniques to insert the storage materials in to foams can be used, the type of catalyst can be varied to thermodynamically match the hydride, and the geometry and surface characteristics of the foam can be varied. In order to customize the gas storage properties of a carbon-based foam, the foam can further include a transition metal catalyst. Suitable catalysts include nickel, cerium, and zirconium catalysts. Catalysts can be added during the sol-gel formation process and are then incorporated into the carbon-based foam that is formed through the sol-gel and drying process, as described in Example 3. Alternatively, catalysts can be incorporated into the carbon-based foam after gel formation by rinsing the gel with a solution including the catalyst. Catalysts can also be introduced into the carbon-based foam at the same time as, or after, introduction of the solid state hydrogen storage material.

The surface chemistry of carbon-based foams can be modified to further alter the gas storage properties of the foam. Example 4 describes the addition of sulfur functional groups to the surface of a carbon cryogel.

The composites of the invention are directed to hydrogen storage in the solid state for release as gaseous hydrogen. A solid state hydrogen storage material is a metal hydride (e.g., $MgH_2$) or a chemical hydride (e.g., AB) that is capable of producing hydrogen gas.

Figure 1B:
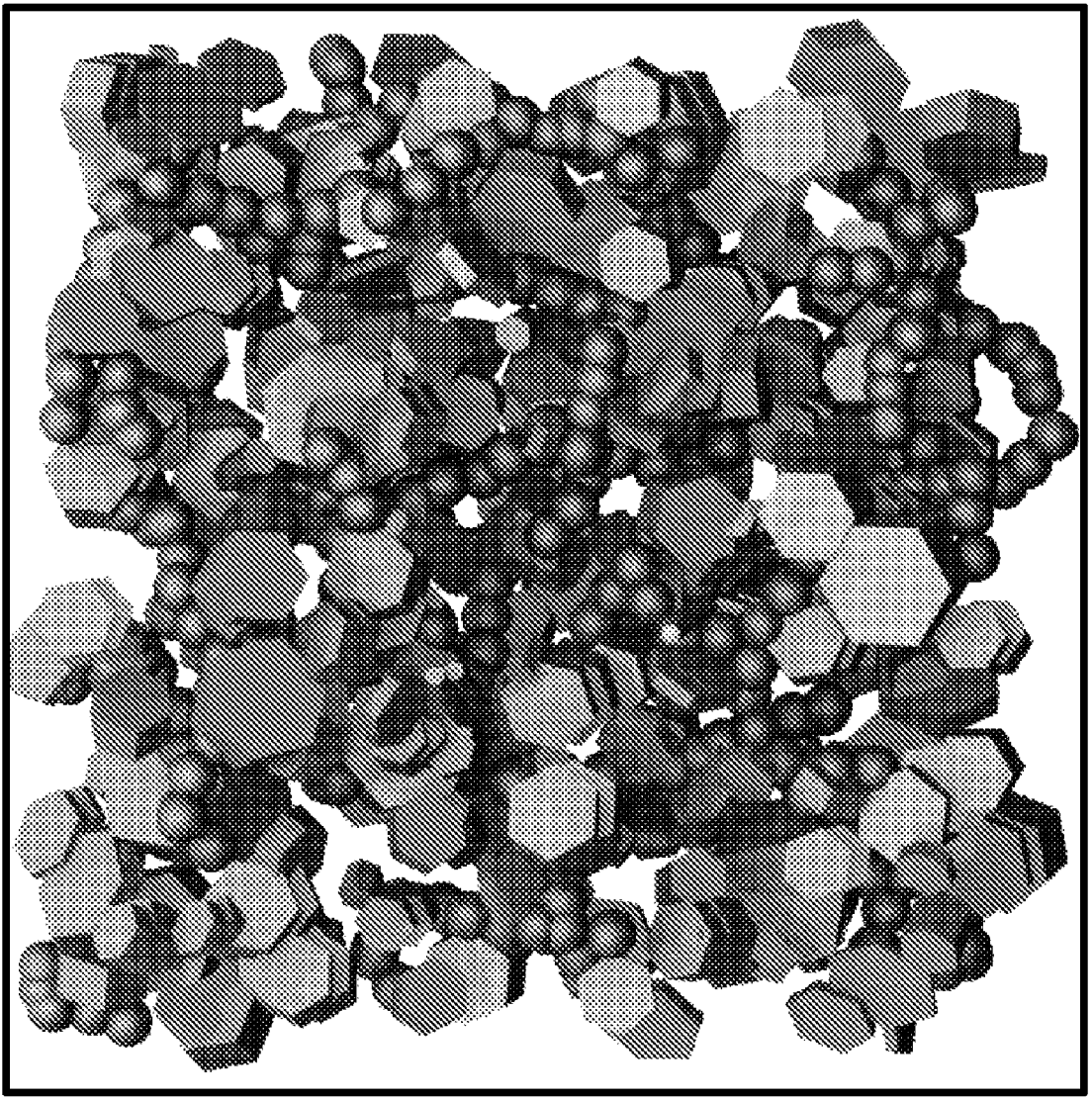
FIG. 1B is a schematic illustration of a representative carbon-based foam composite of the invention (carbon cryogel loaded with magnesium hydride particles)

The present invention advances the nanocomposite concept by providing a composite gas storage material that includes a gas storage phase loaded into the pores of a mesoporous high surface area foam (a representative foam, a carbon cryogel, is illustrated schematically in FIG. 1B). The open, yet cohesive, cryogel allows for excellent heat and mass transfer while providing ample space for hydride loading.

Carbon cryogels can be tuned by modifying the sol-gel parameters to produce a range of meso to microporous percolated carbon networks. Pore size can be manipulated from <2 nm up to >150 nm by changing only the catalyst ratio or percent reactants in the sol, as well as application of post-pyrolysis activation.

The carbon cryogel can be optionally activated by heating at elevated temperature in a carbon dioxide atmosphere. Activation substantially increases micropore volume and provides carbon cryogels having high pore volume, high surface area, and low pore sizes. Activated carbon cryogels have surface areas as high as about 2500 $m^2/g$ whereas non-activated carbon cryogels typically have surface areas between about 500 $m^2/g$ to about 1000 $m^2/g$. Monolith density has been manipulated from as low as about 0.05 $g/cm^3$ to about 1 $g/cm^3$. The range of properties achievable with carbon cryogels makes them ideal for addition and manipulation of hydrogen storage materials in their pores. By utilizing this flexibility, the physical structure of carbon cryogels can be designed for hydride loading and both chemical and metal hydrides can be successfully deposited inside the pores of a cryogel.

Figure 2:
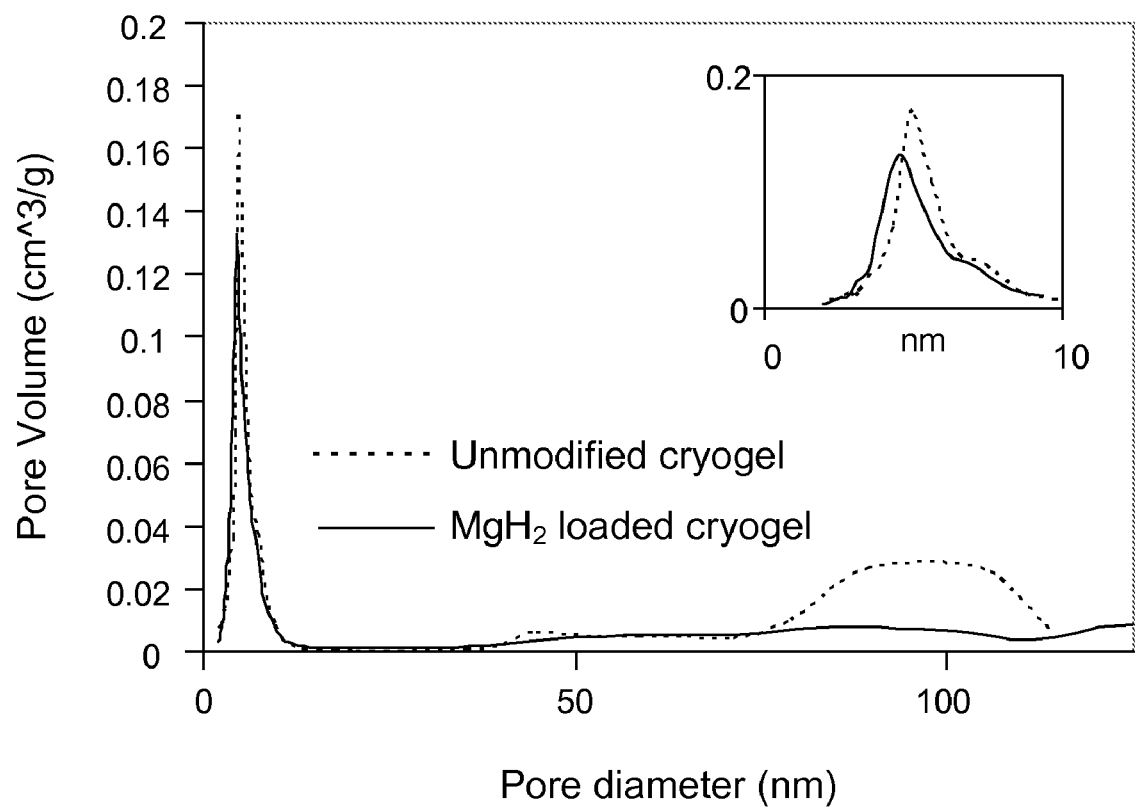
FIG. 2 is a graph comparing pore volume and pore diameter of an unmodified carbon cryogel useful in making the composite of the invention and a representative composite of the invention (carbon cryogel loaded with magnesium hydride)

FIG. 2 shows the pore size distribution for both a plain cryogel and an identically prepared and $MgH_2$ loaded cryogel. The pore size distribution shows a significant peak at 4.5 nm and broader hump centered at about 90 nm. After loading with $MgH_2$, both of these features change. The large pores between 80 nm-110 nm nearly disappear, indicating that pores of this size are almost completely filled with larger particles of $MgH_2$. The smaller pores, however, reduce in volume as a result of $MgH_2$ on the pore walls. As a result, the pore volume reduces from $0.17 cm^3/g$ to $0.13 cm^3/g$ at around 4.5 nm. The inset of FIG. 2 shows an expanded view of the pore size distribution under 10 nm. In this range the peak shifts slightly to the left while maintaining essentially the same shape, thus indicating that pores in this size range are statistically reduced in size, by about 0.5 nm, due to the presence of $MgH_2$.

Only a fraction of the total pore volume of the foam is typically filled. The single point desorption total pore volume of a $MgH_2$ impregnated cryogel is $0.62 cm^3/g$. The single point desorption total pore volume for the unmodified cryogel is $0.98 cm^3/g$. Approximately one third of the total pore volume is consumed, leaving an abundance of pore volume for additional hydrogen storage material. If near total pore filling were achieved, the percent weight hydrogen storage capacity of the composite would reach about 4.7 weight percent storage or 60% of the theoretical maximum $MgH_2$ storage capacity.

The carbon cryogel network possesses a cohesive, yet porous, interconnected network that provides excellent heat flow. Any practical hydride powder based hydrogen storage device will require a heat conduction network. A nanocomposite cryogel-based approach easily fulfills that requirement and can easily be applied to other hydride systems. Not only does the cryogel composite system exhibit a reduction in dehydrogenation temperature for $MgH_2$, but its monolithic and conductive nature represents a significant contribution to system level heat management issues surrounding storage of hydrogen in hydride powder beds.

In another aspect of the invention, methods for making a carbon-based foam are provided. The carbon-based foam can be made by the following representative multi-step sequence:

(1) preparing a sol by mixing at least two components capable of forming an organic sol-gel and a catalyst in water;

(2) gelling the sol by heating at a temperature and for a time sufficient to provide a gel;

(3) drying the gel to provide a polymer foam;

(4) pyrolyzing the polymer foam to provide a carbon-based foam; and (5) contacting the carbon-based foam with a solid state hydrogen storage material in a form that allows the solid state hydrogen storage material to infiltrate the carbon-based foam to provide a carbon-based foam composite.

The carbon-based composites of the invention are obtainable by the method described above.

Carbon-based foams can be formed with the above steps and variations thereof. Processes for making each of the carbon-based foams can include steps (1) and (2), even though the reactants can be tailored based on the desired product (e.g., the amounts and types of the ingredients will affect the overall end structure in terms of porosity and surface area). Drying the gel will determine the type of polymer foam and, ultimately, the carbon-based foam formed. Freeze drying provides a carbon cryogel, supercritical carbon dioxide drying provides a carbon aerogel, and evaporative drying provides a carbon xerogel.

Pyrolyzing the polymer foam provides the carbon-based foam. Pyrolyzation uses high temperature and an oxygen-free environment to reduce the polymer foam (includes carbon and other atoms such as hydrogen and oxygen) to a carbon-based foam (substantially carbon). For example, a polymer foam becomes a carbon-based foam after pyrolysis because excess (i.e., non-carbon) atoms of the polymer foam are removed by the pyrolysis.

A carbon-based foam can be optionally be "activated" by a high temperature treatment that creates additional surface area by forming micropores.

It will be appreciated that the polymer foam prepared as described above may also be useful as a solid state hydrogen storage material to provide a useful composite. In fact, other porous (open foam), high surface area materials that can incorporate solid state hydrogen storage materials and that are stable to conditions for hydrogen release from the materials may also be suitable as useful composites.

In one embodiment, the carbon-based foam is made from a phenolic compound (e.g., resorcinol (R)), formaldehyde (F), water (W), and a catalyst (C).

Phenolic compounds can be reacted with formaldehyde in the presence of a basic catalyst to provide a polymeric gel (crosslinked gel). Suitable phenolic compounds include a polyhydroxy benzene, such as a dihydroxy or trihydroxy benzene. Representative polyhydroxy benzenes include resorcinol (i.e., 1,3-dihydroxy benzene), catechol, hydroquinone, and phloroglucinol. Mixtures of two or more polyhydroxy benzenes can also be used. Phenol (monohydroxy benzene) can also be used. A typical catalyst for the resorcinol/formaldehyde reaction is sodium carbonate. The catalyst can be any compound that facilitates the polymerization of the sol to form a sol-gel.

The ratios of these materials (e.g., R/C and R/W), as well as the processing parameters, determine the ultimate structure and properties of the carbon-based foam. R/C is the molar ratio of resorcinol to catalyst used in making the carbon-based foams; R/W is the weight ratio of resorcinol to water used in making the carbon-based foam.

For carbon-based cryogels having R/W=0.25 a surface area (2400 to 2600 $m^2/g$), total pore volume (1.0 to 1.5 $cm^3/g$).

In one embodiment, the carbon-based foams have a density of from about 0.20 to about 1.0 $g/cm^3$, a surface area of from about 1500 to about 2000 $m^2/g$, and a total pore volume of from about 1.0 to about 1.5 $cm^3/g$.

In one embodiment, carbon-based foams are made from components having R/C of from about 10 to about 500. In one embodiment, R/C is from about 50 to about 500. In one embodiment, R/C is from about 50 to about 300.

In one embodiment, carbon-based foams are fabricated from components having R/W of from about 0.01 to about 2.0. In one embodiment, R/W is from about 0.1 to about 1.0. In one embodiment, R/W is about 0.25.

The preparation and characteristics of the polymer foams, carbon-based foams, activated carbon-based foams, and carbon-based foam composites are described below.

Figure 3A:
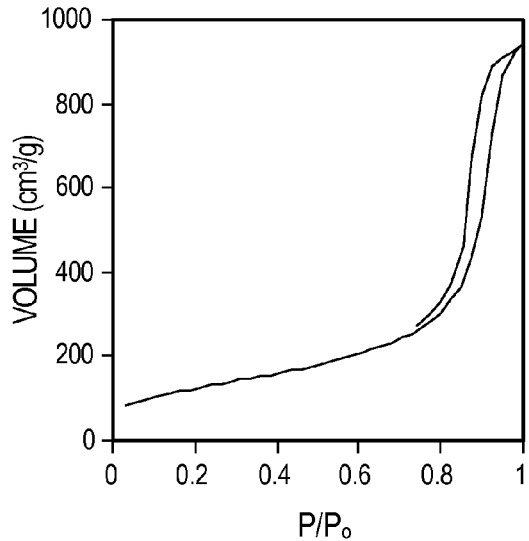
FIGS. 3A-3D are graphs illustrating nitrogen adsorption isotherms and pore size distributions for RF cryogels having R/W constant at 0.005 and R/C 50 (FIG. 3A (nitrogen adsorption) and FIG. 3B (pore size distribution)) and R/C 300 (FIG. 3C (nitrogen adsorption) and FIG. 3D (pore size distribution))
Figure 3B:
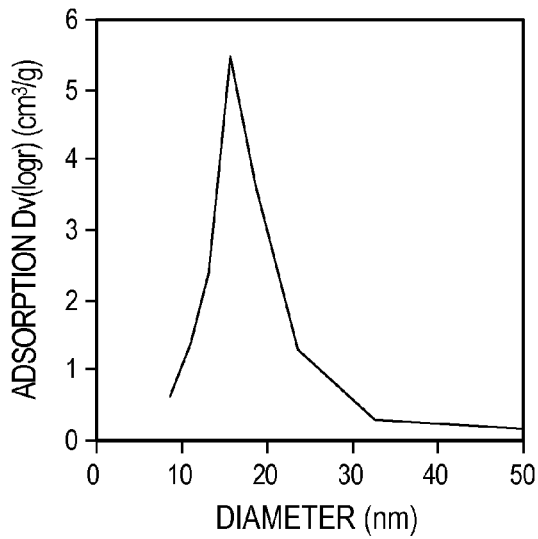
Figure 3C:
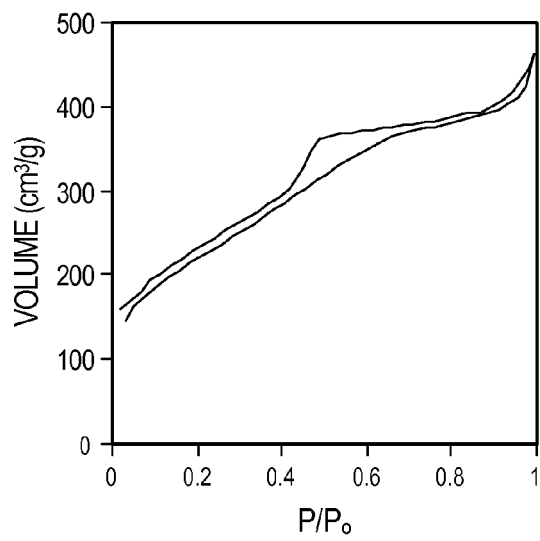
Figure 3D:
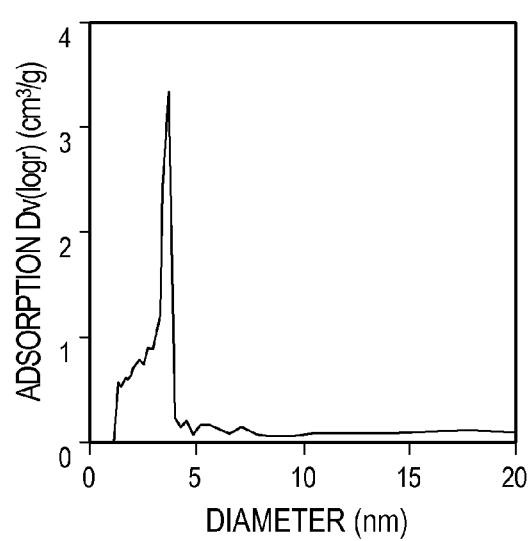

Polymer Foams. Polymer foams can be prepared by freeze drying sol-gels. Relatively little volume loss occurred on drying. Nitrogen sorption (i.e., adsorption and desorption) isotherms and pore size distribution of RF carbon cryogels with R/C ratios of 50 and 300, respectively, are illustrated in FIGS. 3A-3D. Nitrogen sorption isotherms and pore size distributions for representative RF carbon-based foams (cryogels) having R/W constant at 0.005 and R/C 50 are shown in FIG. 3A (nitrogen sorption) and FIG. 3B (pore size distribution), having R/W constant at 0.005 and R/C 300 are shown in FIG. 3C (nitrogen sorption) and FIG. 3D (pore size distribution).

Figure 4:
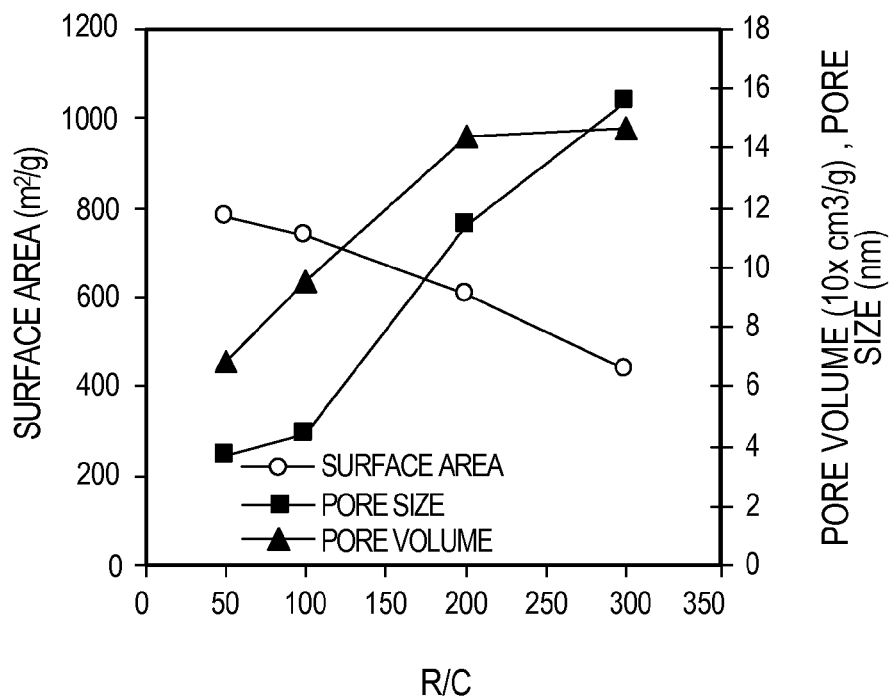
FIG. 4 is a graph comparing surface area ($m^2/g$), pore size (nm), and pore volume ($10\times cm^3/g$) of RF cryogels as a function of R/C with R/W molar constant at 0.005.

As shown in the these figures, a change in R/C from 50 to 300 results in a change in average pore size from about 4 nm to about 16 nm. Pore size, surface area, and pore volume as a function of R/C with R/W molar constant at 0.05 is shown FIG. 4. The surface area of the RF cryogel decreases from 780 m²/g to 439 m²/g as R/C increases from 50 to 300. The pore volume increases from 0.68 cm³/g for R/C 50 to 1.47 cm³/g for R/C 300.

The material property changes can be explained by a phase separation that varies on a scale dependent on the amount of crosslinking that occurs as the material gels during the polymer foam formation process. If significant amounts of catalyst are available (low R/C), the result is a highly crosslinked polymer network that is relatively uniform. The phase separation between the polymer and the solvent occurs at the nanoscale level and results in a more microporous material with high surface area. The overall pore volume is reduced because, although micropores increase the surface area, micropores are relatively small in volume. Alternatively, if only small quantities of catalyst are available, then the reaction occurs more slowly with less crosslinking. This allows the material to phase separate on a larger scale resulting in more meso- and macropores and a correspondingly lower surface area. Thus, R/C is a variable in controlling surface area and micropore size.

The observed mechanical strength of RF sol-gels and cryogels varies noticeably with the sol composition. An increase in R/W results in an increased hardness of both RF sol-gels and carbon-based foams, while an increase in R/C reduces the hardness of the resultant RF sol-gels and carbon-based foams. Such change in mechanical strength can be ascribed to the strength of the gel network. An increased R/W was observed to result in a significantly reduced gelation time. For example, at a constant R/C of 75, the gelation time reduces from 10,000 minutes for R/W of 0.01 to 10 minutes for R/W of 1.00. This fast hydrolysis and condensation reaction results in a dense structured gel network.

Carbon-Based Foams. Carbon-based foams were prepared by pyrolyzing polymer foams. Pyrolysis decomposes organic materials by heating in an oxygen-free environment. Pyrolysis of polymer foams occurs in a substantially oxygen-free environment at a temperature high enough to reduce the polymer foam to a foam that is primarily carbon. A typical pyrolysis will occur in nitrogen gas at 1050° C. for 4 hours. Some residual remnants of the non-carbon elements of the polymer foam may remain. The conversion of RF polymer foams to carbon-based foams is typically accompanied by a volume loss. The estimated volume loss is typically between about 60 to about 80 percent. The weight loss during pyrolysis is typically about 50 percent.

Carbon-based foams can be optionally activated by heating at elevated temperature in a carbon dioxide atmosphere (e.g., 900° C. under carbon dioxide) to provide an activated carbon-based foam. Activation substantially increases micropore volume and provides carbon foams having high pore volume, high surface area, and low pore sizes. Subsequent activation of the carbon foams results in an increase in pore volume, particularly in the microporous range, as illustrated in an activated carbon cryogel in FIG. 5. Activation occurs by the following reaction:

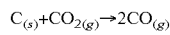

$$C_{(s)} + CO_{2(g)} \rightarrow 2CO_{(g)}$$

Figure 5:
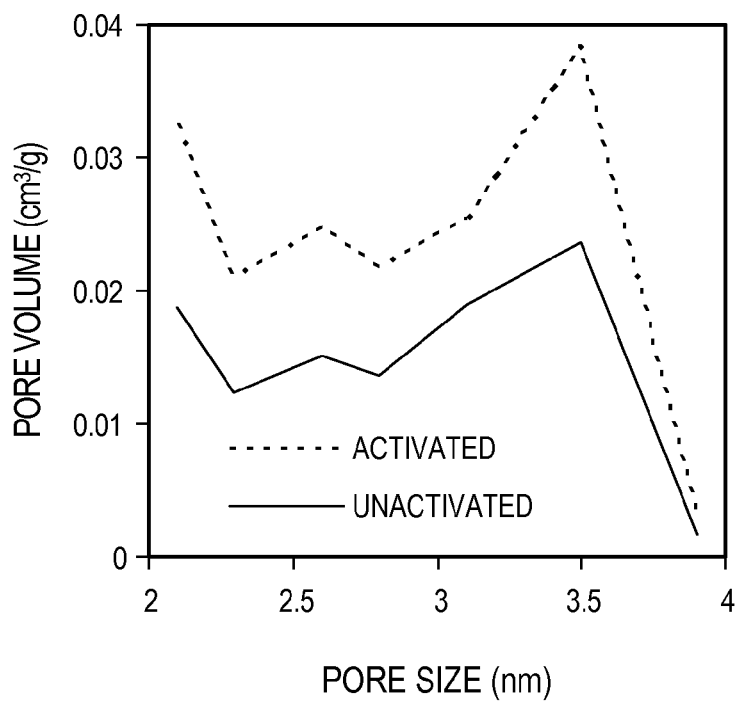
FIG. 5 is a graph comparing pore volume ($cm^3/g$) as a function of pore size between 2-4 nm for activated (dashed line) and unactivated (solid line) carbon cryogels having R/C 50.

The representative carbon cryogel depicted in FIG. 5 was activated for 10 minutes, so the increase in micropore volume is attributed to a relatively small number of new micropores that were exposed as surface carbon material was removed. The activation process can eventually reach a point where so much material is removed that the micropores begin to increase in diameter, thereby reducing the overall surfaces available for adsorption and diminishing the effectiveness of pores. It should be noted that FIG. 5 does not present the entire pore size distribution and this particular sample also has a significant mesoporous peak at about 55 nm. The mesoporous peak was reduced in volume (by about ⅔) after activation.

In one embodiment, carbon cryogels are fabricated having activation of from about 5 to about 90%. In one embodiment, activation is from about 25 to about 75%. In one embodiment, activation is from about 60 to about 80%. As used herein, "% activation" is defined as the difference between the original and final material weights divided by the original material weight.

Carbon-Based Foam Composites. A carbon-based foam composite is formed by loading a hydrogen storage compound into the pores of a carbon-based foam. This is typically done by soaking the foam in a mixture of the gas storage compound in a suitable solvent that will not dissolve the foam. The gas storage compound may actually be solvated in the solvent to provide a solution or it may be a heterogeneous mixture. Typical hydrogen storage compound/solvent systems include MgH₂/t-butanol and ammonia borane/THF. Warming of the solvent may facilitate the solvation of the hydrogen storage compound. Once the cryogel has soaked in the solution for a sufficient time to allow the hydrogen storage compound in the solution to infiltrate and fill the foam pores, the foam is removed from the solution and freeze dried or vacuum dried. Upon freeze drying, the hydrogen storage compound is solidified in the pores of the foam, resulting in a carbon-based foam hydrogen storage composite.

Hydrogen Storage. Carbon-based foams are ideal for hydrogen storage. A purpose of the composites of the invention is to provide a storage mechanism for hydrogen. By storing hydrogen in the solid state, the amount of hydrogen able to be stored on a per unit volume basis is increased. Hydrogen is not stored in a composite in the gaseous, diatomic form, but is instead in the form of a hydride complex, either chemical or metal. When making a composite for hydrogen storage, a carbon-based foam is first formed and then the solid state hydrogen storage material is infiltrated into the foam. The porous nature of the carbon-based foam provides many benefits for gas storage when compared to the powdered form of the solid state hydrogen storage material, including providing a large surface area and improved heat conduction. Because the release of hydrogen from a metal hydride is generally a reversible process, as long as the core of the solid state hydrogen storage material (i.e., the metal center) still remains in the foam, hydrogen can then be added back into a depleted composite (i.e., recharging) and the hydride reformed.

In another aspect, the present invention provides a method for hydrogen storage. In the method, a vessel containing a hydrogen storage material comprising a carbon-based foam composite is contacted with hydrogen. The composites of the invention can be used for hydrogen storage by placing the composite in a vessel and contacting that vessel to a hydrogen source. Any depleted solid state hydrogen storage material (capable of accepting hydrogen) can take up the hydrogen and form a hydride for solid state storage of hydrogen. Upon heating, the hydride releases the hydrogen.

In another aspect, the present invention provides a gas storage vessel. The gas storage vessel comprises a vessel and a composite of the invention. The vessel is sealable to retain the hydrogen. Various inlet and outlet ports are optional for directing hydrogen released from the composite or to provide hydrogen for enriching depleted solid state hydrogen storage material with hydrogen.

In another aspect, the present invention provides a method for charging a carbon-based composite with a solid state hydrogen storage material. In the method, a carbon-based foam composite that has discharged an amount of hydrogen is contacted with a liquid that includes a solid state hydrogen storage material. In certain embodiments, a depleted solid state hydrogen storage material will not be able to be enriched ("recharged") with hydrogen once it has discharged hydrogen from the solid state. In this case, the depleted composite can be further contacted with solid state hydrogen storage material by soaking the carbon-based foam in a liquid containing a solid state hydrogen storage material. This may, but need not, be a process identical to the original formation of the composite.

In another aspect, the present invention provides a method for charging a carbon-based foam composite with hydrogen. In the method a hydrogen storage vessel containing a carbon-based foam composite is contacted with to a source of hydrogen. The carbon-based foam composite is at least partially hydrogen depleted. The hydrogen source has a pressure sufficient to cause the gas to infiltrate the carbon-based foam composite to provide a hydrogen-enriched carbon-based foam composite.

In another aspect, the present invention provides a device for charging a hydrogen-depleted carbon-based foam composite with hydrogen. The device comprises a carbon-based foam composite and a means for filling the carbon-based foam composite with hydrogen.

In another aspect, the present invention provides a method for discharging hydrogen stored in a carbon-based foam composite. In the method, a hydrogen storage vessel containing a carbon-based foam composite is connected to a system (e.g., fuel cell) in need of hydrogen.

Figure 6:
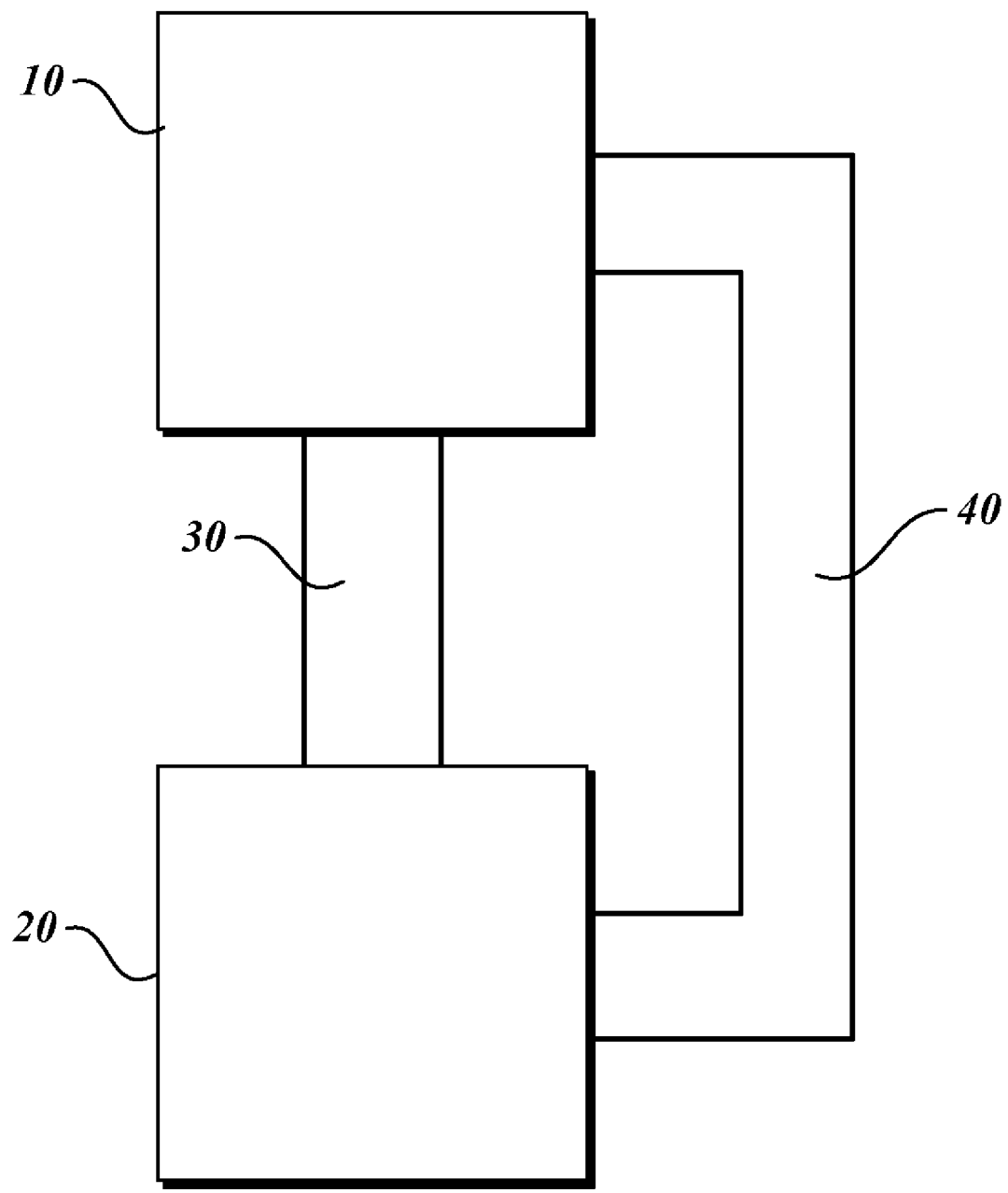
FIG. 6 is a schematic illustration of a fuel cell system comprising a fuel cell that is supplied with hydrogen from a vessel including the composite of the invention.

In another aspect, the present invention provides a system that includes a hydrogen storage vessel and a fuel cell capable of converting hydrogen into energy. The hydrogen storage vessel is a vessel that contains a composite of the invention. In the system, the fuel cell is in gaseous communication with the vessel. FIG. 6 illustrates a representative system. Referring to FIG. 6, fuel cell 10 is in gaseous communication with storage vessel 20 through connector 30. Heat from fuel cell 10 can be returned to storage vessel 20 through heat conductor 40 for causing the release of hydrogen from the composite within the storage vessel.

In another aspect, the present invention provides a method for lowering the temperature required for releasing hydrogen from a solid state hydrogen storage material. In the method, a carbon-based foam is contacted with a solid state hydrogen storage material having a first hydrogen release temperature to provide a composite having a second hydrogen release temperature, wherein the second hydrogen release temperature is lower than the first hydrogen release temperature. In one embodiment, the solid state hydrogen storage material comprises a metal hydride. In one embodiment, the solid state hydrogen storage material comprises a chemical hydride.

The following examples are provided for the purpose of illustrating, not limiting, the invention.

EXAMPLES

Example 1

The Preparation of a Representative Magnesium Hydride Carbon Cryogel Composite

The chemicals utilized in this example are as follows: resorcinol {99+%, Sigma-Aldrich, $C_6H_4(OH)_2$}, formaldehyde solution {37%—stabilized with methanol ($C_2H_5OH$), Fisher Scientific, $COH_2$}, sodium carbonate {99.5%, Sigma-Aldrich, $NaCO_3$}, trifluoroacetic acid {99%, Aldrich, $C_2HF_3O_2$}, tert-butyl-alcohol (t-butanol) {99.8%, J. T. Baker, $(CH_3)_3COH$}, and magnesium hydride {$MgH_2$}. These were used as received without further treatment. Carbon cryogels with resorcinol:catalyst ratio (R/C) held at 50:1 or 200:1, the weight percent solids at 5% (R/W) were fabricated using the method described in Pekala, R W., *Journal of Materials Science* 24(9):3221-7, 1989, as modified by the method described in Tamon, H., Ishizaka, H., Yamamoto, T., Suzuki T., 379(12): 2049-55, 1999. The molar ratio of resorcinol to formaldehyde was maintained at 1:2 for all sols. The sols were prepared by admixing resorcinol and formaldehyde in stirred deionized water then adding catalyst at room temperature. The resulting sols were sealed in glass ampoules and gelled at 90° C. for 7 days. The resulting RF sol-gels underwent solvent exchange to replace water with trifluoroacetic acid (pH: 1.9) followed by t-butanol by rinsing 3 times in fresh t-butanol for 24 hours each time followed by subsequent freeze drying for 3 days. The resulting RF cryogels were pyrolyzed at 1050° C. in $N_2$ for 4 hours.

The carbon cryogel $MgH_2$ composite was formed by inserting $MgH_2$ into the pores of the cryogel by the following method. A dry carbon cryogel was weighed and then soaked in fresh warm t-butanol for 2 days to wet the surface. The wetted cryogel was then placed in a dispersion of warm t-butanol and $MgH_2$ (in excess) supported above a stir bar to maintain the dispersion. The resulting carbon cryogel-$MgH_2$ composite was removed, excess $MgH_2$ powder was rinsed from the surface of the cryogel with warm t-butanol. The composite was frozen at −10° C. for 8 hours and then placed in the freeze drier for 3 days. The sample was weighed again. Samples were analyzed by means of transmission electron microscopy (TEM), and nitrogen sorption isotherms. Hydrogen storage analysis using a Sievert's apparatus (as described in Hsu, Y. S., Perng, T. P., *Journal of Alloys and Compounds* 227(1): 180-185, 1995) was performed as follows. The samples were loaded into a glass slip inside a stainless steel tube and evacuated at room temperature for 90 minutes and then evacuated at 110° C. for 40 minutes. From that point the reaction vessel temperature was increased at 1° C./min while pressure changes were monitored and recorded every 10 minutes up to 230° C. and then every 1 minute until the test was complete.

Figure 7:
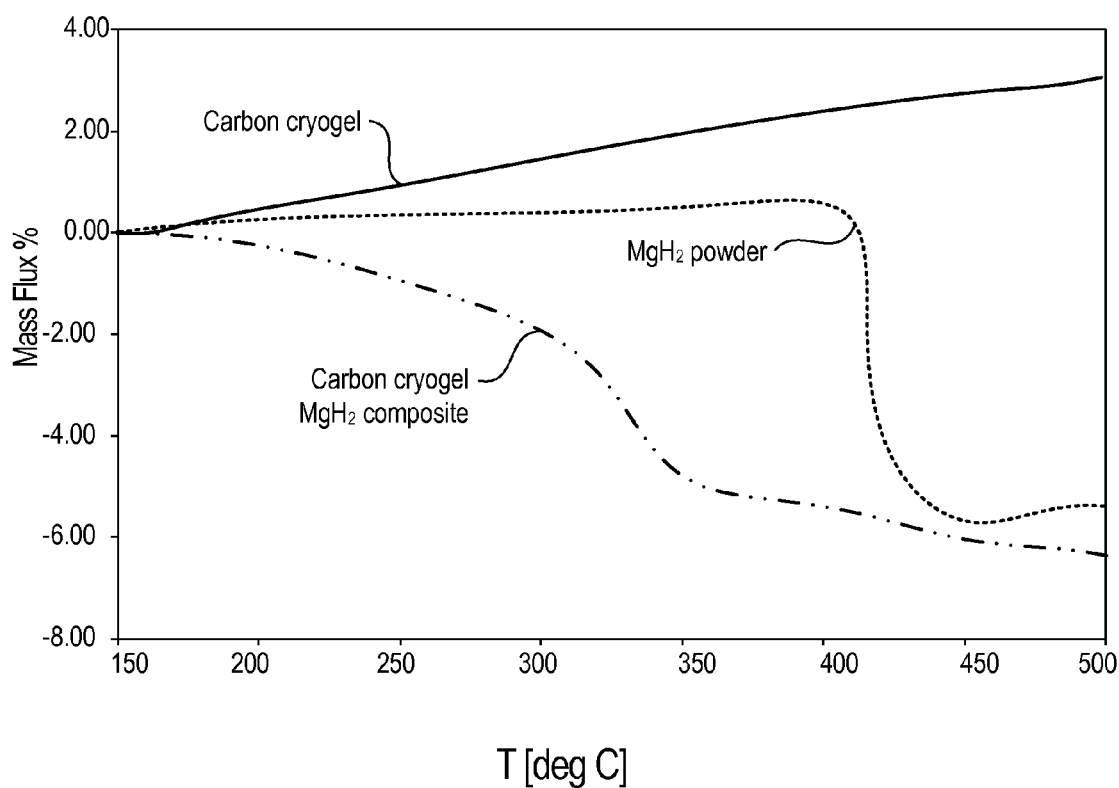
FIG. 7 is a graph comparing the thermal decomposition of a carbon cryogel, magnesium hydride (powder), and a representative composite of the invention (carbon cryogel loaded with magnesium hydride); illustrating significant mass loss for the composite at a temperature of about 100° C., below that for magnesium hydride.

A nanocomposite (carbon cryogel with R/C: 200 and R/W: 0.03 loaded with magnesium hydride) was tested for hydrogen decomposition temperature. The carbon cryogel after $MgH_2$ insertion contained approximately 15% hydrogen storage alloy. Based on the theoretical hydrogen storage capacity of $MgH_2$ of 7.6 wt %, the theoretical hydrogen storage capacity of the composite would be 1.14 wt %. FIG. 7 shows the results of the hydrogen desorption test run on the sample. The sample experienced peak hydrogen desorption rate at 330° C. As can be seen in FIG. 7, bulk $MgH_2$ desorbs the majority of its hydrogen content at temperatures well above 400° C. The commingling of $MgH_2$ with nanoporous carbon has reduced the decomposition temperature of the hydrogen storage alloy to 100° C. below its normal level.

Figure 8A:
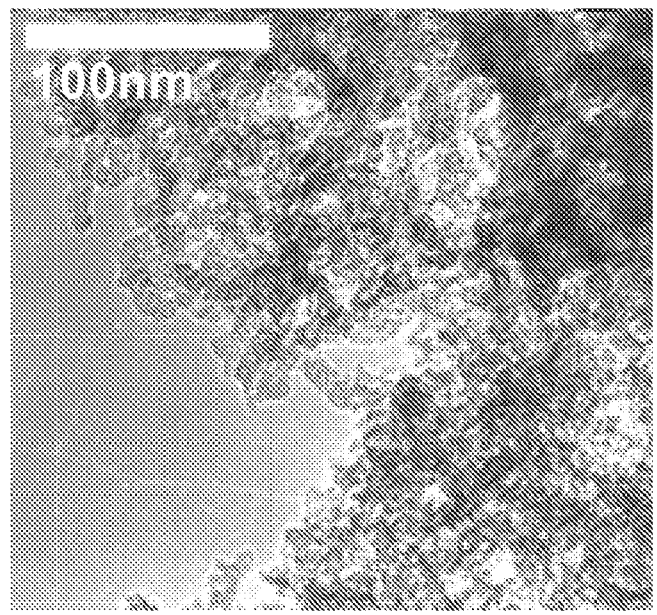
FIG. 8A is a transmission electron microscope (TEM) image (175000×) of an unmodified carbon cryogel useful in making the composite of the invention.
Figure 8B:
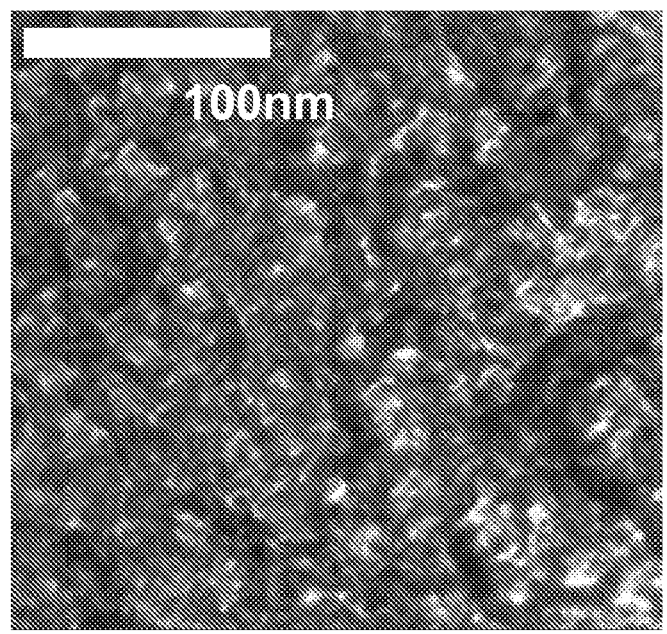
FIG. 8B is a transmission electron microscope (TEM) image (175000×) of a representative composite of the invention (carbon cryogel loaded with magnesium hydride)

TEM images shown in FIG. 8 indicate the difference in morphology between a carbon cryogel (FIG. 8A) and an $MgH_2$ loaded carbon cryogel (FIG. 8B). Both images were taken at 175000×. A diffraction pattern was taken after the high magnification TEM beam was used to dehydrogenate the $MgH_2$ loaded cryogel. This process resulted in a diffraction pattern that revealed an interatomic spacing of 0.30 nm consistent with an HCP Mg crystal.

Example 2

The Preparation of a Representative Ammonia Borane Carbon Cryogel Composite

Figure 9:
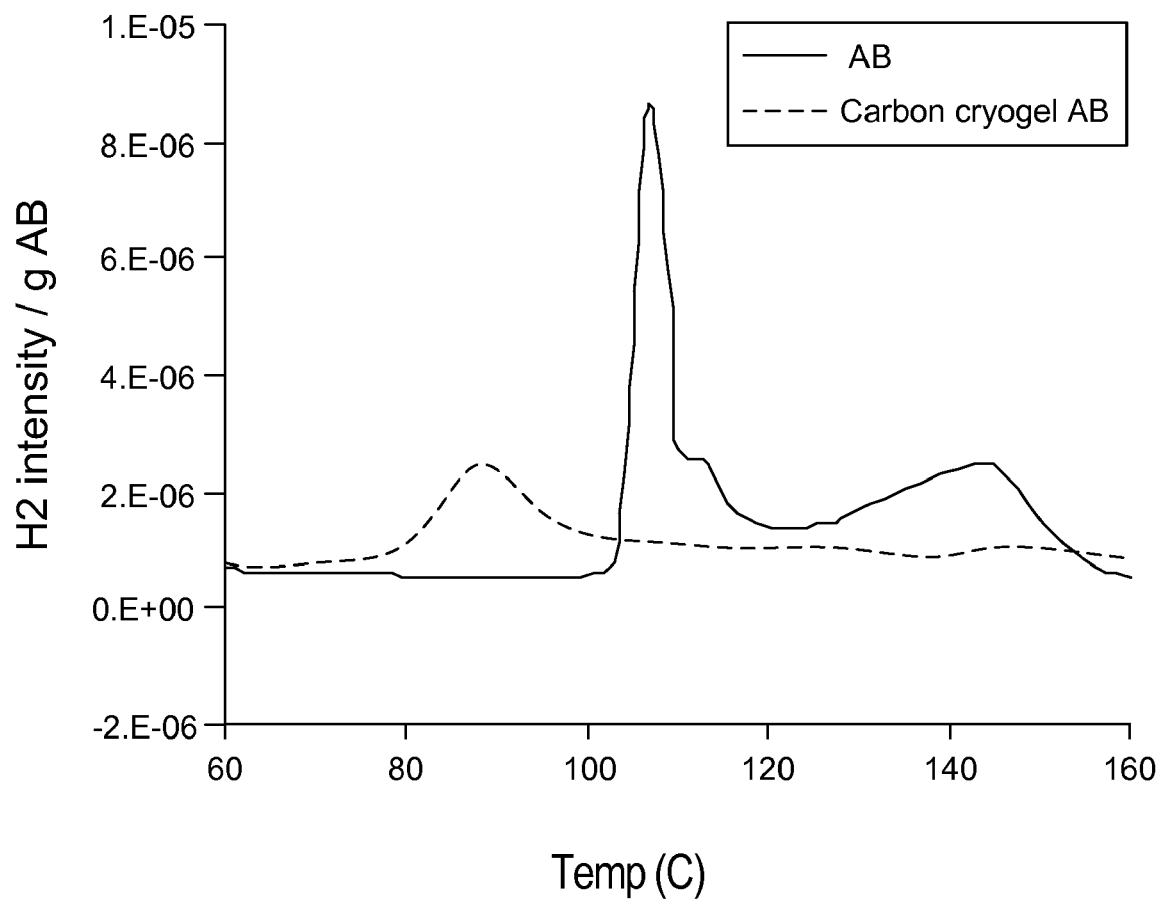
FIG. 9 is a graph comparing hydrogen release from ammonia borane (AB) and a representative composite of the invention (carbon cryogel loaded with ammonia borane); illustrating that release of hydrogen occurs as a function of temperature and that the carbon cryogel loaded with ammonia borane releases hydrogen at a temperature lower than ammonia borane.
Figure 10:
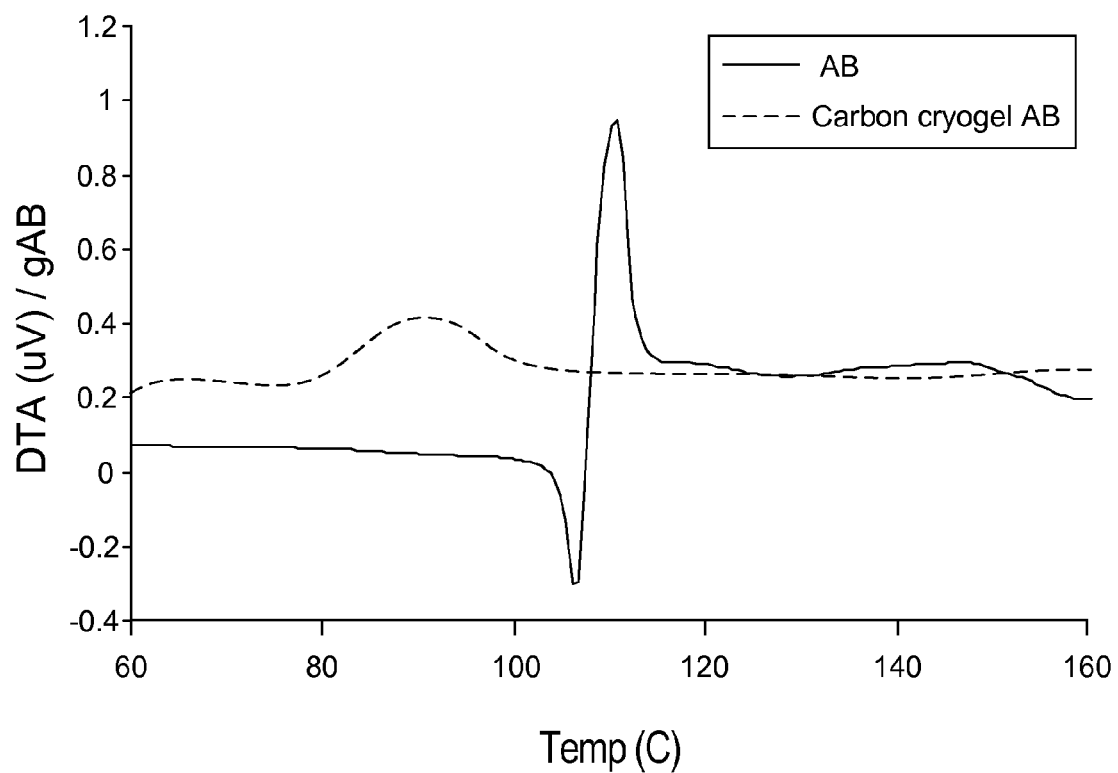
FIG. 10 compares differential scanning calorimetry graphs for ammonia borane (AB) and a representative composite of the invention (carbon cryogel loaded with ammonia borane); illustrating an endotherm followed abruptly by an exotherm at about 110-120° C. for ammonia borane (AB) and a broad endotherm at a lower temperature followed by an exotherm at around the same temperature as for ammonia borane for the representative composite of the invention.
Figure 11:
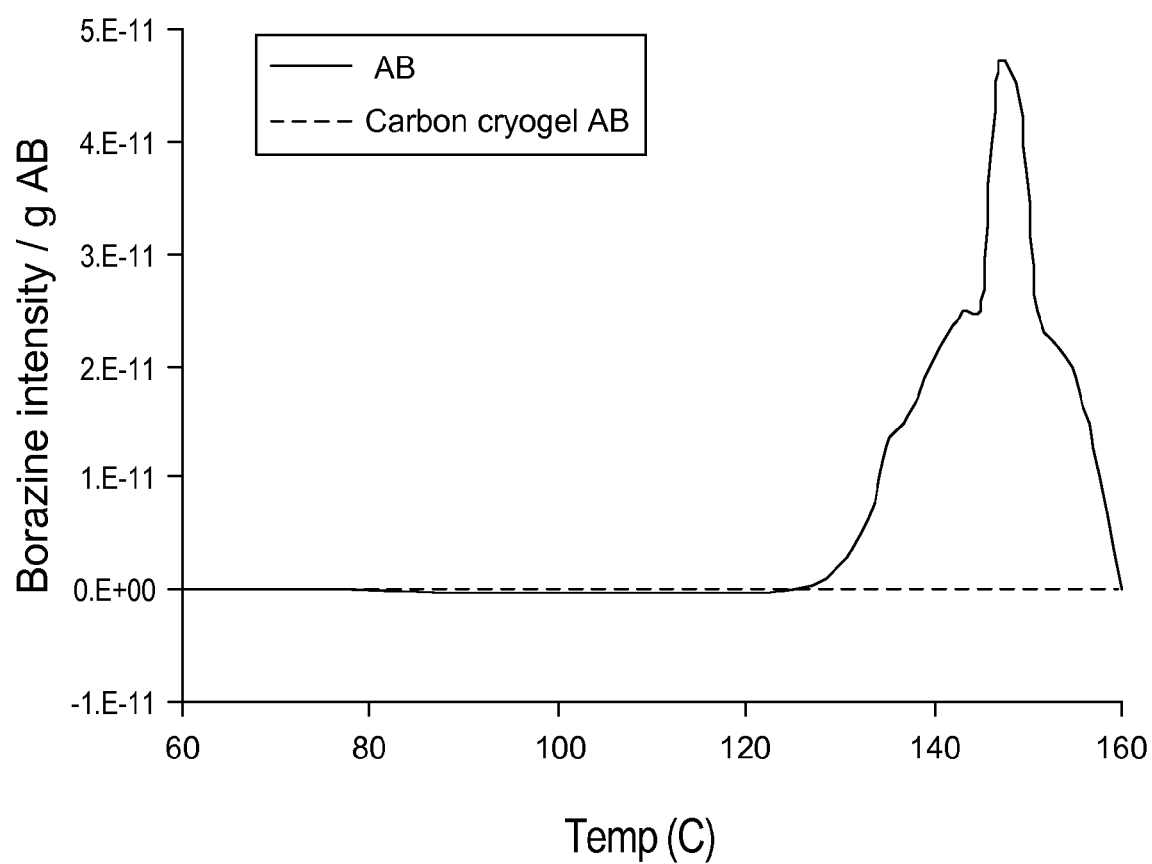
FIG. 11 is a graph comparing the formation of borazine from ammonia borane (AB) and a representative composite of the invention (carbon cryogel loaded with ammonia borane); illustrating that while ammonia borane releases borazine in a significant quantity, the representative composite of the invention does not.

Ammonia borane (AB) AB was added to THF until saturation and then loaded into a carbon cryogel to achieve a 37% by weight AB composite material. AB shows a significant reduction in decomposition temperature. FIG. 9 shows the decomposition peak for bulk AB at about 100° C. While the AB carbon cryogel composite demonstrates the same peak hydrogen release temperature, the hydrogen release begins at a much lower temperature of 50° C., indicating a significant change in the reaction. This is supported by FIG. 10 which shows a change in the thermodynamics as demonstrated by differential scanning calorimetry (DSC) (heating rate of 1° C./min). FIG. 10 shows an endothermic reaction starting at the same temperature that hydrogen release begins. FIG. 11 also shows a change in the reaction byproducts. AB when dehydrogenated in bulk will release large quantities of borazine. This is not the case for the AB carbon cryogel composite material as can be seen by the absence of the borazine release peak shown in FIG. 11 as compared to the straight AB. Thus the carbon cryogel AB composite has demonstrated favorable changes in the reaction chemistry over that of only AB.

Example 3

Metal Catalyst Addition to Carbon-Based Foams

Carbon-based foams are doped with transition metal catalysts including Ni, Ce, and Zr catalysts. Two sets of sols with R/C:50 and R/C:300 were made and then further separated into four, to which nickel acetate and Ce/Zr acetate were added in small quantities. The nickel acetate was added to each batch at 2.5% of the weight of resorcinol and the equal molar combination of Ce/Zr acetate was added at 3.1% of the weight of resorcinol. The carbon-based foams were then processed according to the standard route (as described above) to create carbon-based cryogels, but were not activated in $CO_2$. The cryogels were characterized by TEM and XRD revealing the presence of the catalysts in the cryogel lattice.

Example 4

Surface Functionalization of Carbon-Based Foams

In order to change the surface chemistry of a carbon cryogel, sulfur functional groups were added to the surface. This was achieved while the cryogel was still in the carbon-based foam stage of processing. A carbon-based foam was placed in a solution of ethanol with 40 mM 3-thiophenocabozaldehyde/2 mM phthaloyl dichloride and soaked at 50° C. for two days with the solution changed out once over that period. After the soak was complete, the foam was processed as described above and pyrolyzed at 1050° C. This resulted in sulfur on the surface of the carbon foam as detected by NMR.

The embodiments of the invention in which an exclusive property or privilege is claimed are defined as follows:

1. A method for making a carbon-based foam composite comprising a carbon-based foam and a solid state hydrogen storage material, comprising:
   (a) preparing a sol by mixing a catalyst and at least two components capable of forming an organic sol-gel in water;
   (b) gelling said sol by heating at a temperature and for a time sufficient to provide a gel;
   (c) drying said gel to provide a polymer foam;
   (d) pyrolyzing said polymer foam to provide a carbon-based foam; and
   (e) contacting said carbon-based foam with a solid state hydrogen storage material wherein said solid state hydrogen storage material infiltrates said carbon-based foam to provide a carbon-based foam composite.

2. The method of claim 1, wherein said components capable of forming a sol-gel comprise resorcinol and formaldehyde.

3. The method of claim 2, wherein the molar ratio of resorcinol to catalyst is from about 10 to about 2000.

4. The method of claim 1, wherein gelling said sol comprises heating at a temperature and for a period of time sufficient to convert said sol to a crosslinked gel.

5. The method of claim 1, wherein gelling said sol comprises heating at about 90° C. for from about 1 to about 7 days.

6. The method of claim 1, wherein pyrolyzing said polymer foam comprises heating at a temperature and for a time sufficient to provide a carbon-based foam.

7. The method of claim 6, wherein pyrolyzing said polymer foam comprises heating at about 1050° C. for about 4 hours in a substantially oxygen-free environment.

8. The method of claim 1, further comprising heating said carbon-based foam at a temperature and for a time sufficient to provide an activated carbon-based foam.

9. The method of claim 8, wherein heating at a temperature and for a time sufficient to provide an activated carbon-based foam comprises heating at about 900° C. under carbon dioxide.

10. The method of claim 1, wherein drying said gel comprises freeze drying.

11. The method of claim 1, wherein said solid state hydrogen storage material for infiltrating said foam is in liquid form.

12. The method of claim 1, wherein said solid state hydrogen storage material is a metal hydride.

13. The method of claim 1, wherein said solid state hydrogen storage material is a chemical hydride.

14. The method of claim 1, wherein said solid state hydrogen storage material comprises $Mg_2FeH_6$, $Na_3AlH_6$, $NaAlH_4$, $MnNi_5H_6$, $TiCr_{1.8}H_{1.7}$, $Mg_2NiH4$, $CaNi_5H_5$, $TiFeH$, $MgH_2$, $LaNi_{5.5}Al_{1.5}H_5$, or $LaNi_4AlH_5$.

15. The method of claim 1, wherein said solid state hydrogen storage material comprises ammonia borane, $LiAlH_4$, $LiBH_4$, $NaAlH_4$, or $NaBH_4$.

16. The method of claim 1 wherein said solid state hydrogen storage material comprises magnesium hydride or ammonia borane.

17. The method of claim 1, wherein drying said gel comprises supercritically drying.

18. The method of claim 1, wherein drying said gel comprises evaporative drying.

* * * * *